(No Model.)
H. H. SHELDON.
BROILER.
No. 254,709. Patented Mar. 7, 1882.
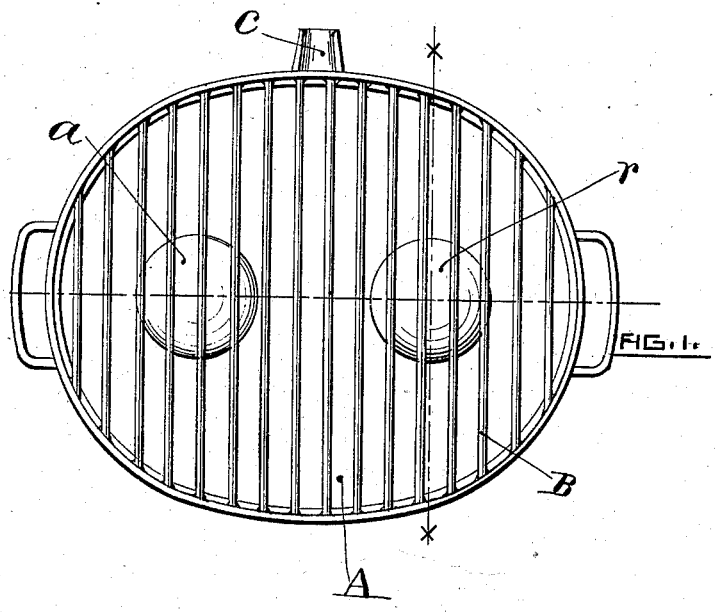
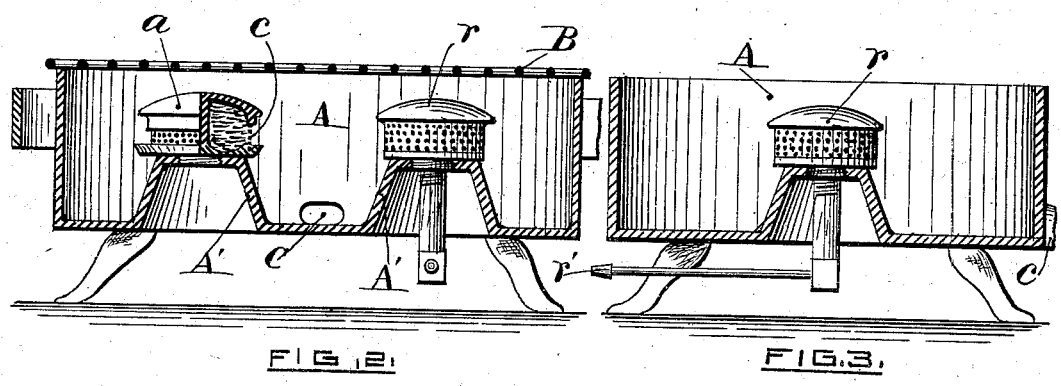
WITNESSES:
Chas Hannigan
Geo H Remington
INVENTOR:
Henry H Sheldon

UNITED STATES PATENT OFFICE.

HENRY H. SHELDON, OF PAWTUCKET, RHODE ISLAND.

BROILER.

SPECIFICATION forming part of Letters Patent No. 254,709, dated March 7, 1882.

Application filed January 13, 1882. (No model.)

*To all whom it may concern:*

Be it known that I, HENRY H. SHELDON, a citizen of the United States, residing at Pawtucket, in the county of Providence and State of Rhode Island, have invented certain new and useful Improvements in Broilers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improved apparatus for broiling meats, &c.; and it consists of a suitable metallic dish and gridiron heated with vapor-retort or gas burners.

Figure 1 represents a top view of my invention, which is oval in form. Fig. 2 is a vertical longitudinal section of the same through the center, showing the vapor-retort and gas burners, which are placed one in each end of the oval dish. Fig. 3 is a vertical transverse section of the same through line $x\ x$ of Fig. 1.

A represents a dish or pan of proper height, upon which rests the gridiron B in close proximity to the burners $a$ or $r$.

Upon the bottom, and near each end of the dish A, are raised two hollow truncated cones, A′, which support the vapor-retort burner $a$ or gas-burner $r$. The particular object of these cones is to protect the burners from juices, &c., which collect on the bottom of the dish A during the process of cooking. The dish A is also provided with a spout, C, whereby the said juices or gravy may be drawn off.

The operation of my invention is as follows: The burners being lighted, the meat or other article to be cooked is put in an ordinary toaster or broiler and the latter placed upon the gridiron B. The heat from the burners quickly cooks the meat, and the juices and dressing are caught and retained in the dish or pan A and withdrawn through the spout C.

Having thus described my invention, I claim—

The improved broiler herein described, consisting of the dish A, its bottom provided with the truncated cones A′ and spout C, the gridiron B, and vapor-retort or gas burners $a$ and $r$, the whole arranged as and for the purpose specified.

In testimony whereof I have affixed my signature in presence of two witnesses.

HENRY H. SHELDON.

Witnesses:
CHARLES HANNIGAN,
GEO. H. REMINGTON.